United States Patent
Williams

(10) Patent No.: US 6,205,494 B1
(45) Date of Patent: Mar. 20, 2001

(54) CONTROLLER WITH AUTOMATIC GENERATION OF LINKED LIST OF DATA TRANSFER DESCRIPTORS FOR SEQUENTIAL COMMANDS, WITH LINKED LIST BEING USED FOR EXECUTION OF SEQUENTIAL DATA TRANSFERS

(75) Inventor: Jeffrey L. Williams, Rochester, MN (US)

(73) Assignee: Western Digital Corporation, Irvine, CA (US)

( * ) Notice: Subject to any disclaimer, the term of this patent is extended or adjusted under 35 U.S.C. 154(b) by 0 days.

(21) Appl. No.: 09/215,414

(22) Filed: Dec. 18, 1998

(51) Int. Cl.[7] ............. G06F 13/24; G06F 13/38; G06F 13/00; G06F 13/12; G06F 13/28
(52) U.S. Cl. ............. 710/5; 710/20; 710/22; 710/24; 710/72; 710/74; 710/262
(58) Field of Search ............. 364/251.5, 251.7; 709/100, 101; 710/5, 7, 20, 22, 24, 52, 62, 64, 72, 74, 260, 261, 262, 263

(56) References Cited

U.S. PATENT DOCUMENTS

| | | | |
|---|---|---|---|
| 4,965,801 | | 10/1990 | DuLac . |
| 5,428,802 | * | 6/1995 | Anglin et al. ............. 395/800 |
| 5,448,709 | | 9/1995 | Chandler et al. . |
| 5,504,868 | | 4/1996 | Krakirian . |
| 5,613,141 | * | 3/1997 | Szatkowski et al. ............. 395/800 |
| 5,675,766 | * | 10/1997 | Petersen ............. 395/481 |
| 5,742,822 | * | 4/1998 | Motomura ............. 395/672 |
| 5,752,083 | * | 5/1998 | Krakirian ............. 395/894 |
| 5,852,719 | * | 12/1998 | Fishler et al. ............. 395/200.46 |
| 5,854,911 | * | 12/1998 | Watkins ............. 395/383 |
| 5,913,925 | * | 6/1999 | Kahle et al. ............. 712/206 |
| 5,954,801 | * | 9/1999 | Sokolov ............. 710/5 |
| 6,029,226 | * | 2/2000 | Ellis et al. ............. 711/100 |

\* cited by examiner

*Primary Examiner*—Thomas Lee
*Assistant Examiner*—Tanh Nguyen
(74) *Attorney, Agent, or Firm*—Milad G Shara

(57) ABSTRACT

A command queuing engine in a target controller ASIC automatically detects sequential commands received from an initiator and generates a linked list of data transfer descriptors for the sequential commands. The data transfer descriptors are automatically processed by the command queuing engine to reduce command overhead from interrupt processing by a microprocessor in the target controller, thereby improving the performance of the target controller.

15 Claims, 7 Drawing Sheets

SCSI 6 BYTE COMMAND DESCRIPTOR BLOCK (CDB)

QUEUE TAG MESSAGE

COMMAND REGISTERS

DATA TRANSFER DESCRIPTOR (DTD)

CONTROLLER WITH AUTOMATIC GENERATION OF LINKED LIST OF DATA TRANSFER DESCRIPTORS FOR SEQUENTIAL COMMANDS, WITH LINKED LIST BEING USED FOR EXECUTION OF SEQUENTIAL DATA TRANSFERS

BACKGROUND OF THE INVENTION

1. Field of the Invention

This invention relates to storage target controllers which respond to commands from initiators. More particularly, the invention relates to hardware assistance in a storage target controller for optimizing command processing, thereby improving performance.

2. Description of the Prior Art and Related Information

Each device connected to a SCSI bus is classified as either an initiator or a target. An initiator originates an operation and is usually a host computer. A target device performs the operation and is usually a peripheral device controller directed by a microprocessor. One example of a target device is a disk drive. There can be multiple initiators and targets on a SCSI bus.

A disk drive target controller receives commands to read or write data from an initiator, such as a host computer. The disk controller typically comprises a microprocessor for interpreting the commands, setting up disk operations resulting from the commands, and managing a buffer to cache data transferred to and from the disk. An ASIC (application specific integrated circuit) is connected to the microprocessor to provide an interface to the SCSI bus and alert the microprocessor with priority interrupts when commands are received from the host. The performance of a target disk controller depends in part on the time required by the microprocessor to interpret, set up, and execute the commands, sometimes termed command overhead. For commands specifying long data transfers, the command overhead is amortized over relatively long periods and is less significant. When data transfers specified by each command are relatively short, the command overhead becomes a significant performance factor.

A target disk controller receives a SCSI command from the host initiator in the form of a six, ten or twelve byte command descriptor block (CDB). FIG. 1 illustrates a 6-byte (numbered byte 0–5) CDB 100, representative of the type of information conveyed in the command. Byte 0, the first byte, has two segments—a group code 102 and a command code 104. The group code 102 implies the number of bytes in the CDB, while the command code 104 specifies an operation such as Read or Write. Byte 1 comprises a three-bit logical unit number (LUN) 106 which addresses up to eight logical entities within the target and a five-bit field 108A which contains the most significant bits of a logical block address (LBA), the indivisible addressable unit in the target. Disk drives conventionally have one LUN and the host views and references data in the drive as a sequence of LBAs ranging from 0 to the maximum capacity of the drive. Each LBA represents a block of data which is a fixed length, conventionally 512 bytes although other block sizes can be defined. The logical block address continues in bytes 2 and 3 providing segments 108B and 108C. Collectively 108A–C provide the starting LBA for the current command.

Byte 4 varies depending on the command to be executed. For read and write commands which transfer data, the byte is a transfer length field 110 providing the number of data blocks to be transferred. Alternately for other types of commands, byte 4 may contain a parameter list length field 112 or an allocation length field 114. CDBs of 10 and 12 bytes in length provide larger fields for logical block addresses. CDB byte 5 is a control byte 116 and may contain vendor-specific information and flags. Conventionally, a microprocessor in the target controller receives the CDB 100 and schedules execution of disk activity according to the requirements in the command.

FIG. 2 shows the format of a queue tag message which may be received by the target from a host initiator. Tagged queuing allows a target to accept multiple I/O processes from a single initiator and intelligently choose which command to perform. A 2-byte queue tag message 200 is sent by the initiator following connection to the target and prior to sending a read or write CDB 100.

The first byte of the queue tag message 200 contains a message code 202 indicating the order in which the target may schedule the command for execution. Simple queue tag (20h) message code indicates that the command may be executed in any order desired, based on the target's command queue management algorithm. Ordered queue tag (22h) message code directs the target to execute the command in the order received with respect to other ordered queue tag messages received. All commands with simple queue tag messages received prior to a command with an ordered queue tag message are executed before the command received with the ordered queue tag message. All commands with simple queue tag messages received after commands with an ordered queue tag message are executed after the command received with the ordered queue tag message. Head of queue (21h) message code 202 directs the target to place the command first in the queue so as to be executed next. A command with a head of queue message code is executed prior to any queued I/O process. The second message byte 204 contains a queue tag which uniquely identifies the I/O process requested.

Frequently, a series of commands is received by the target which specifies contiguous chains of LBAs. These commands are termed "sequential" and the target microprocessor is able to recognize the sequentiality and improve the efficiency of disk operations and host data transfer as a result. Despite the improvement from recognizing sequentiality, the performance of the system suffers from the time required for the microprocessor to process each command, termed command overhead, including interrupting the microprocessor for each command received and executing code to process the command. This is particularly true when a series of sequential commands specify relatively short chains of LBAs so that the ratio of command overhead to command execution is high.

FIG. 3 shows an example of prior art processing of a group 300 of four sequential read CDBs 305,310,315,320 received by a target. For each CDB in the group 300, an interrupt 350 of the target microprocessor is requested. The target microprocessor responds to the priority interrupt 350, parses the command to determine requirements and schedules (queues) future execution of disk operations and host transfers 360 for the command. As each disk and host transfer operation completes, status 380 is sent to the initiator. The sequence of FIG. 3 is valid for a series of read commands. In the event of a series of write commands, the host interface must be programmed by the microprocessor to send status after the data has been written to the disk. An interrupt is requested after the status is sent to inform the microprocessor that the host has received completion status for the command. Returning to the read command case, in the course of processing the commands after each interrupt 350, the target microprocessor is able to recognize the sequential nature of commands 305,310,315, and 320 and may advantageously cause the data for all four commands to be read during one revolution of the disk, providing that the commands are received and queued in time.

Particularly when performing a series of relatively short length read or write commands, the command overhead resulting from interrupts is a significant percentage of the overall time required to execute each command thus reducing the performance of the disk drive. A need therefore exists to provide a performance improvement by reducing command overhead.

SUMMARY OF THE INVENTION

This invention can be regarded as a target interface controller for connecting a target to an initiator over a communication bus. The target interface controller comprises: a host interface means, for connecting to the communication bus and for communicating between the target and the initiator; an interface microprocessor; a bus interface means for connecting to the interface microprocessor; a command queuing means, connected to the bus interface means and separated from the interface microprocessor, to automatically execute a plurality of initiator commands.

The command queuing means further comprises: a means for detecting that one of the plurality of initiator commands specifies a first string of data blocks and is a thread_start_ command comprising a start of a thread; a means for generating a data transfer descriptor for each of the plurality of initiator commands; a means for detecting that an initiator command subsequent to the thread_start_command references a second string of contiguous data blocks that sequentially follows the first string of data blocks; a means for storing the data transfer descriptors generated for each initiator command; a means for linking the data transfer descriptors to form a thread of sequential data transfers; and a command execution means for retrieving the data transfer descriptors to cause the thread of sequential data transfers to be executed.

In another aspect, the invention can be regarded as a disk drive comprising the above described target interface controller.

In still another aspect, the invention can be regarded as a target interface controller integrated circuit for use in a disk drive target connectable to an initiator and having an interface microprocessor. The integrated circuit comprises: a host interface means, for connecting to the communication bus and for communicating between the target and the initiator; a bus interface means for connecting to the interface microprocessor; a command queuing means, connected to the bus interface means and separated from the interface microprocessor, to automatically execute a plurality of initiator commands.

The command queuing means in the integrated circuit comprises: a means for detecting that one of the plurality of initiator commands specifies a first string of data blocks and is a thread_start_command comprising a start of a thread; a means for generating a data transfer descriptor for each of the plurality of initiator commands; a means for detecting that an initiator command subsequent to the thread_start_ command references a second string of contiguous data blocks that sequentially follows the first string of data blocks; a means for storing the data transfer descriptors generated for each initiator command; a means for linking the data transfer descriptors to form a thread of sequential data transfers; and a command execution means for retrieving the data transfer descriptors to cause the thread of sequential data transfers to be executed.

DETAILED DESCRIPTION

Figure 9:
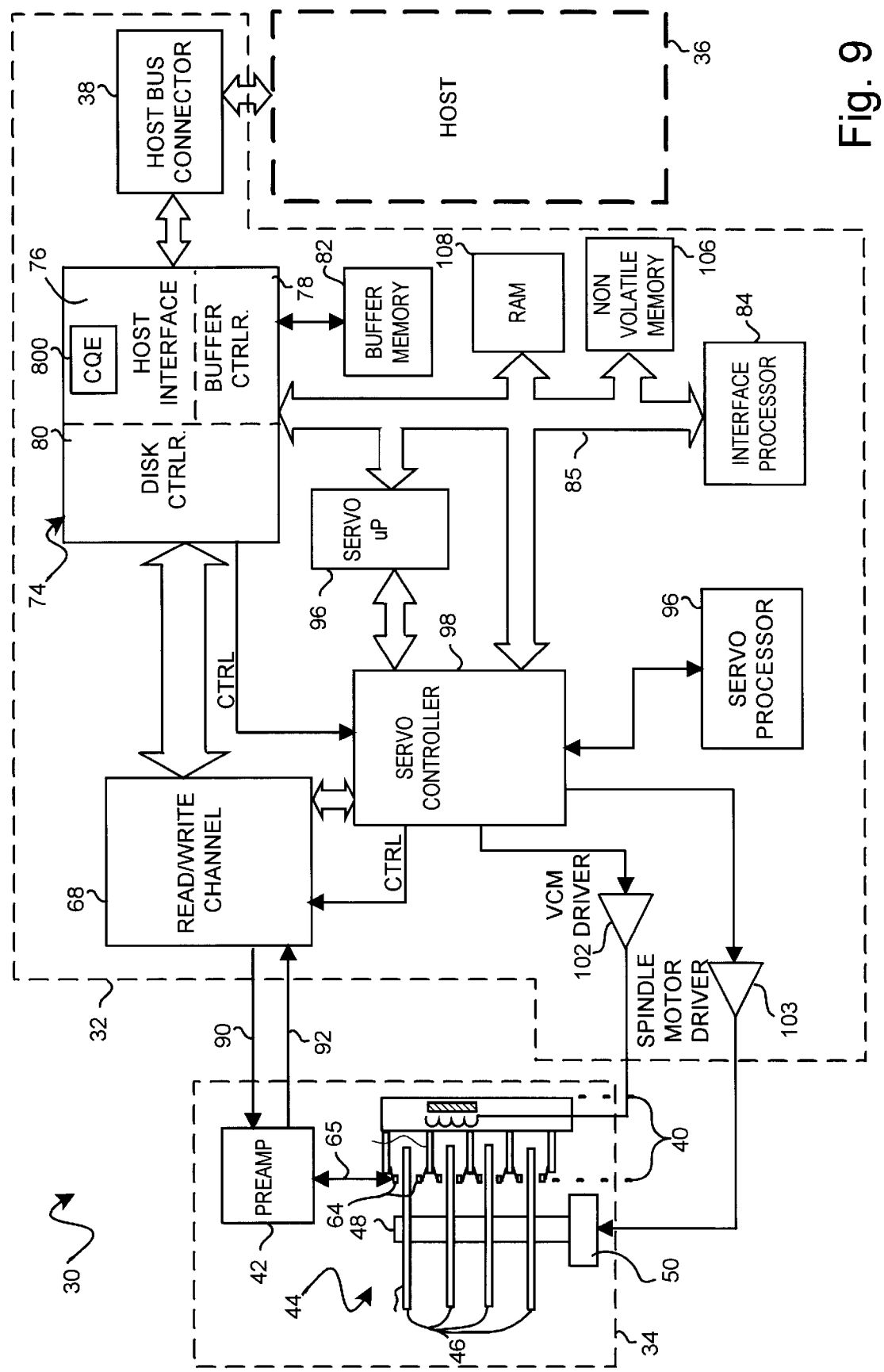
FIG. 9 is a block diagram of a disk drive that incorporates an embodiment of this invention.

A disk drive according to the present invention is illustrated generally at 30 in FIG. 9. Disk drive 30 includes a disk controller printed circuit board assembly (PCBA) 32 and a head disk assembly (HDA) 34. Disk controller PCBA 32 includes circuitry and processors, which 5 provide a target interface controller for communicating between a host system 36 and HDA 34. Host system 36 can include a microprocessor-based data processing system such as a personal computer or other system capable of performing a sequence of logical operations. Data is transmitted between host system 36 and disk controller PCBA 32 via a host bus connector 38. HDA 34 includes an actuator assembly 40, a preamplifier 42, and a disk assembly 44. Disk assembly 44 includes a plurality of magnetic media disks, stacked on a spindle assembly 48. Spindle assembly 48 is mechanically coupled to a spindle motor 50 for rotating the disks at a high rate of speed.

Actuator assembly 40 includes a voice coil motor, and multiple actuator arms. Located at the end of each actuator arm are one or more transducer heads such as 64, which are associated with a respective disk surface. Transducer heads 64 communicate with disk controller circuit board 32 via a cable assembly 65 connected to preamplifier 42 for reading and writing data to the transducer head's associated disk surface. Preamplifier 42 provides an amplified signal to a read/write channel 68 of disk controller circuit board 32. Read/write channel 68 performs encoding and decoding of data written to and read from the disks.

A servo processor 96 provides intelligent control of actuator assembly 40 and spindle motor 50 through a servo controller 98. By commands issued to servo controller 98 by servo processor 96, VCM driver 102 is coupled to move actuator assembly 40 and spindle motor driver 103 is coupled to maintain a constant spin rate of spindle motor 50.

Disk controller printed circuit board assembly 32 includes a host interface disk controller (HIDC) application specific integrated circuit (ASIC) 74. HIDC 74 includes a host interface 76, a buffer controller 78, and a disk controller (formatter) 80. Host interface 76 communicates with host system 36 via host bus connector 38 by receiving commands and data from and transmitting status and data back to host system 36. A command queuing engine 800, described in more detail below is incorporated into host interface 76. Buffer controller 78 controls a buffer memory 82 employed for storing data from host system 36 which is to be written to disks 44. In addition, buffer controller 78 controls buffer memory 82 for storing data read from disks 44 to be transmitted to host system 36 via host interface 76. Buffer memory 82 typically comprises random access memory (RAM), such as dynamic random access memory (DRAM).

Disk controller 80 tracks the timing of data sectors passing under a currently selected transducer head and accordingly sends data to and receives data from read/write channel 68. Disk controller 80 also provides for error correction and error detection on data transmitted to or read from disks 44.

An interface processor 84 efficiently manages a queue of commands received from host 36 with the assistance of the present invention embodied in a command queuing engine (CQE) 800 embedded in host interface 76. The structure embodying the invention can be implemented by those skilled in the art in various forms, the integration with host interface 76 being shown for illustration purposes. Interface processor 84 interfaces with functional elements of PCBA 32 over a bus 85, for transfer of commands, data, and status.

Disk system operational programs are stored in non-volatile memory 106, such as read-only memory (ROM) or flash memory, and are loaded into RAM 108 for execution by interface processor 84. Alternatively, portions of disk system operational programs are stored on reserve cylinders on disks 44. Suitably, servo processor 96 may have integrated or separate memory (not shown) for storage of servo programs.

Figure 4:
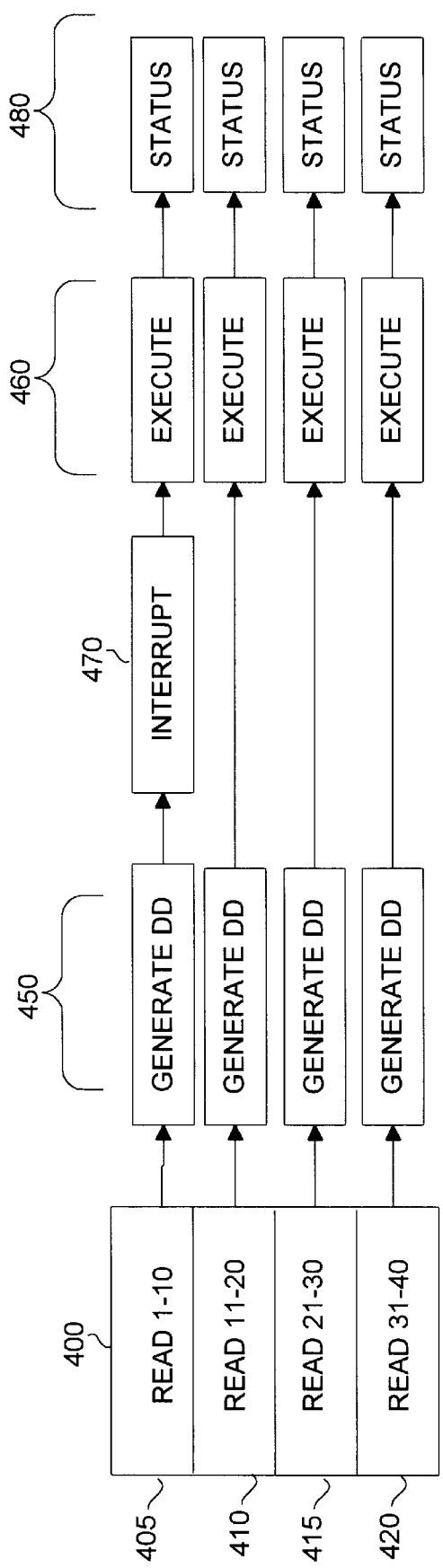
FIG. 4 shows processing of four sequential read command descriptor blocks according to the resent invention, with interrupt generation only after the first command and the thread is executed.

The operation of the invention to reduce command overhead is shown in block overview form in FIG. 4. As each of sequential read commands 405, 410, 415, and 420 in a thread 400 is received, CQE 800 generates at 450 a corresponding data transfer descriptor 600 (DTD). Data transfer descriptor DTD 600 is described in detail in the FIG. 6 discussion below. In effect, DTD 600 is an extraction of relevant data from the incoming CDB 100 which forms a basis for sequential linkage with a previously received command. The first DTD 600 generated at 450 by CQE 800 from command 405 results in an interrupt request 470 to processor 84. In the case shown in FIG. 4, processor 84 queues the command for execution and enables CQE 800 to automatically handle subsequent sequential commands linked to the first DTD 600. As each subsequent command 410, 415, 420 is received, CQE 800 generates a linked DTD 600 and does not request an interrupt of processor 84. In other cases commands 410, 415, and 420 may arrive before processor 84 is interrupted or queues commands for execution. CQE 800 will nevertheless generate linked DTD 600s for these commands. Using the linked list of DTD 600s, CQE 800 interacts with functional sections of HIDC ASIC 74 to execute at 460 the disk and host transfer portions of each command. As each command is completed, CQE 800 automatically transmits status at 480 to host 36. Preferably, processor 84 can determine whether CQE 800 transmits status automatically or defers to processor initiated status transmission. Preferably, when automatic status transmission by CQE 800 is enabled, status is transferred after requested data for each read command is transmitted to the host, whereas for write commands, status is transferred after data has been written on the disk surface.

Figure 1:
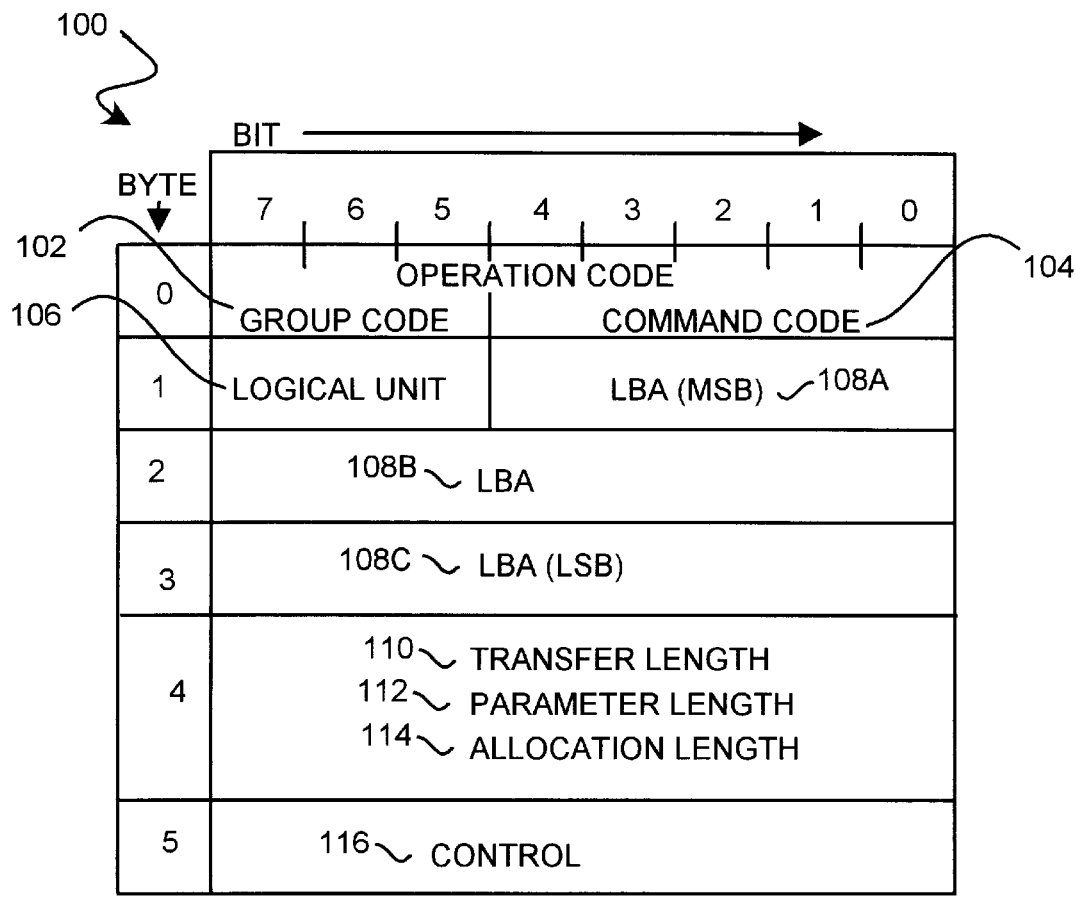
FIG. 1 is an illustration of a 6-byte SCSI command descriptor block (CDB).
Figure 2:
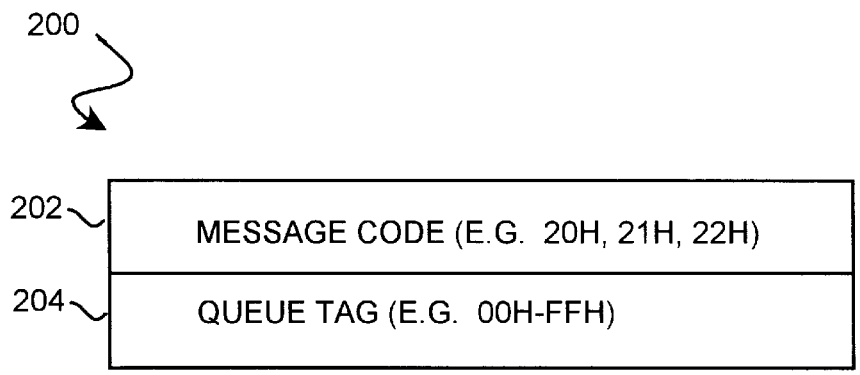
FIG. 2 is an illustration showing the format of a SCSI queue tag message.
Figure 3:
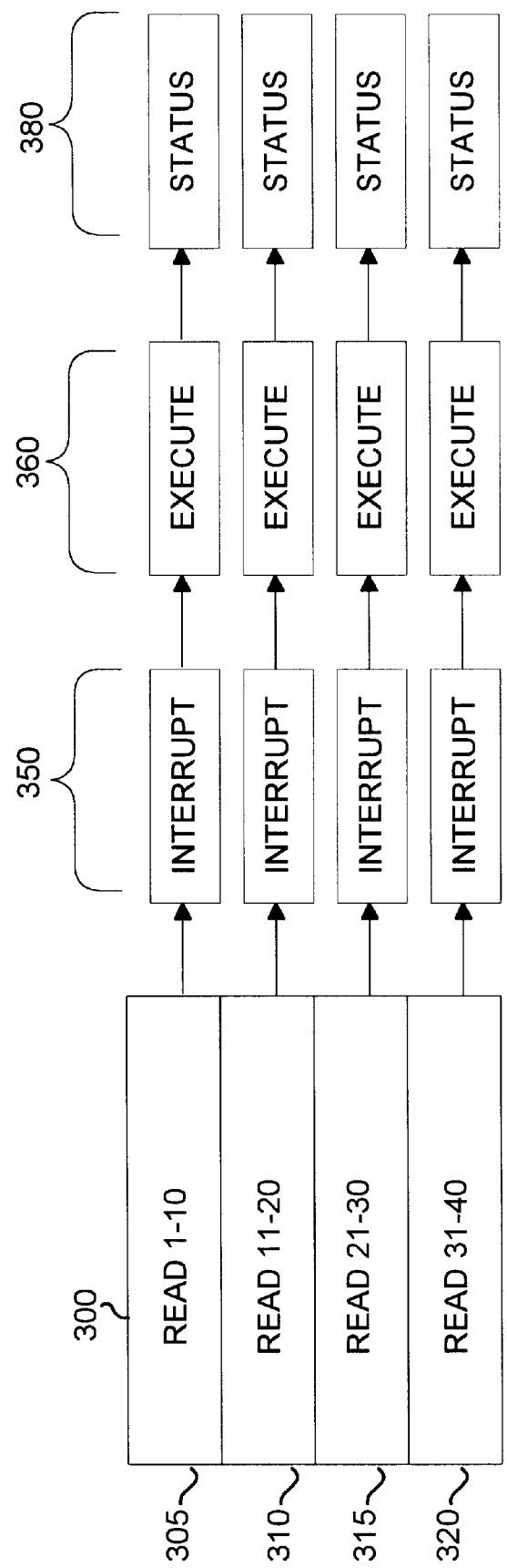
FIG. 3 shows prior art processing and command overhead of four sequential read command descriptor blocks with interrupt generation when each command is received and completed.

Comparing the overview of FIG. 4 to the prior art FIG. 3, it can be readily seen that a significant reduction in command overhead is achieved by eliminating intervening interrupt requests. In the event that more fine tuned control is desired, each DTD 600 is accessible to microprocessor 84 and can be modified to selectively create intervening interrupts. Once the thread is initiated by creating the first DTD 600 however, each subsequent sequential command can be detected automatically by CQE 800 which compares the current CDB 100 to the last received CDB 100, stored in a command register file 830 shown in FIG. 5, and if the current command is sequential, a linked DTD 600 is created. In order to optimize performance, microprocessor 84 can interact with CQE 800 by re-ordering the execution of active threads to minimize mechanical and rotational latency. Then, having established a mechanically efficient order of command execution, microprocessor 84 can activate threads in the preferred order for execution by CQE 800 as discussed further below.

Figure 8:
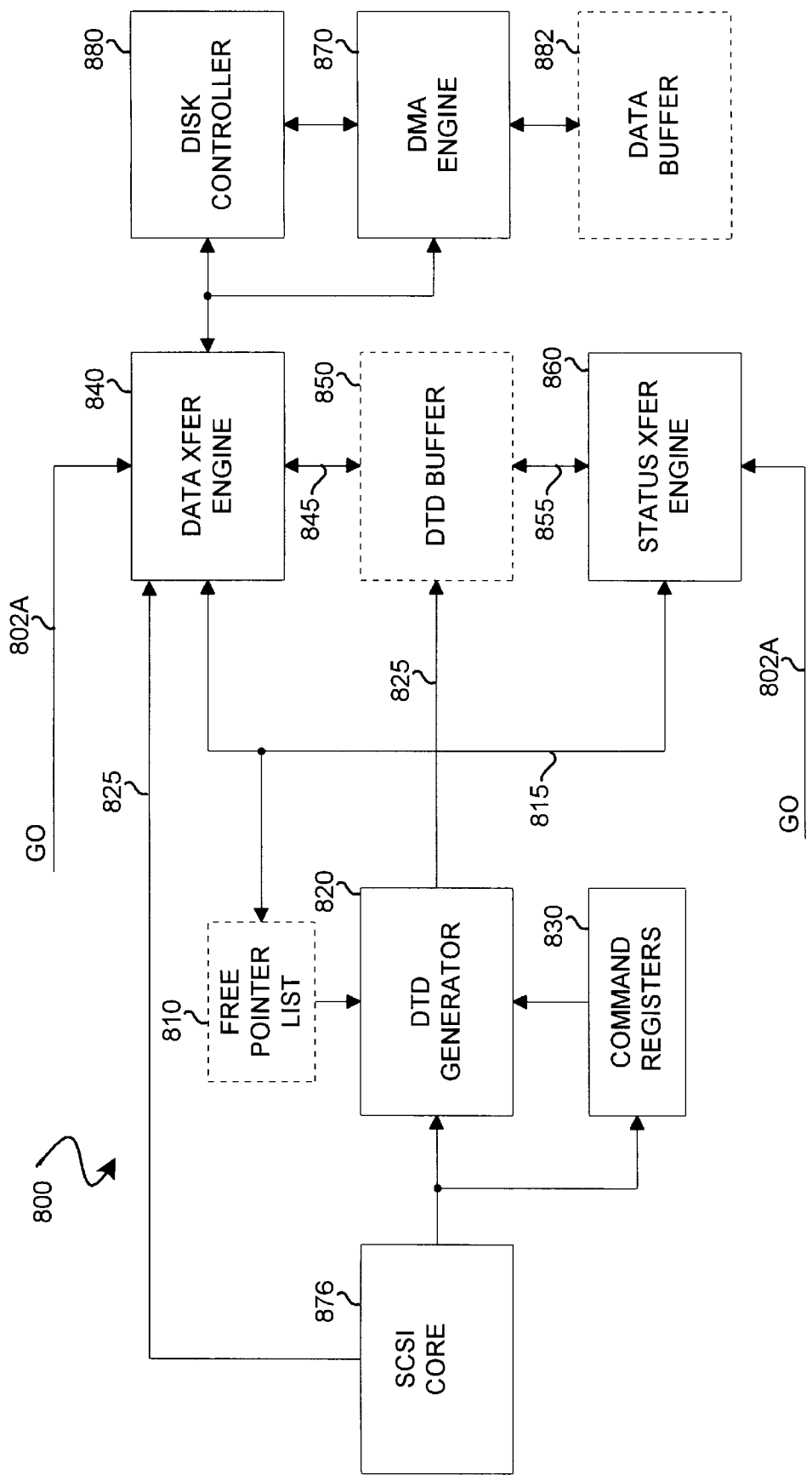
FIG. 8 is a block diagram of a command queuing engine embodying the invention including a data transfer descriptor generator and data transfer and status engines.

FIG. 8 shows a block diagram comprising command queuing means CQE 800 providing a means for automatically processing initiator commands separately from microprocessor 84. Commands received from an initiator such as host 36 by a target such as disk drive 30 are received via a communication bus such as a SCSI bus by an interface means such as SCSI core 876. An incoming command is stored in command registers 830 and is processed by a data transfer descriptor generator (DTDG) 820 to generate a data transfer descriptor DTD 600. DTDG 820 compares the incoming command to a previously received command in command registers 830 and if the incoming command is not sequential to the command stored in command registers 830, DTDG 820 creates a DTD 600 and requests an interrupt to notify microprocessor 84 of the arrival of a command which begins a new thread (thread_start_command). If the incoming command is sequential to the previously stored command, DTDG 820 creates a linked DTD 600 and does not interrupt microprocessor 84. In either case, DTDG 820 finds a memory pointer to a free slot in a DTD buffer 850 for storing a DTD 600 from a free pointer list 810 which is initialized by interface processor 84. The starting memory address and extent of free pointer list 810 is provided to CQE 800 by microprocessor 84. Thereafter, CQE 800 updates a reference to the free pointer list each time a DTD 600 is created or when a command represented by a DTD 600 is completed. The free pointer list is used to dynamically manage the buffer space for DTD 600 storage. Each DTD 600 created by DTDG 820 is stored in DTD buffer 850 over a transfer bus 825. Suitably, DTD buffer 850 may be accessed by DTDG 820 via buffer controller 78 if the buffer memory 82 serves as the storage media or may be implemented in a memory array contained within HIDC 74. Other suitable means for implementing DTD buffer 850 will be apparent to those skilled in the art.

Continuing with the block diagram of CQE 800 in FIG. 8, each DTD 600 is processed for command execution by CQE 800 with two logic engines—data transfer engine 840 and status transfer engine 860. When interface processor 84 initiates the execution of a thread, it sends a "GO" command to data transfer engine 840 via command line 802A with an accompanying reference to a DTD 600 in DTD buffer 850. The GO command may be implemented by setting register bits or other well known means. When the GO command is received by data transfer engine 840, the referenced DTD 600 is fetched from DTD buffer 850 over connection 845. The DTD 600 generated by CQE 800 provides information required for command execution, including command tag and transfer count. Prior to transmitting the GO command, processor 84 provides any additionally required information, such as initiator specific information. Disk controller 880 is programmed by processor 84 to transfer data between data buffer 808 and HDA 34. Data transfer engine 840 provides information to DMA (direct memory access) engine 870 for transferring data to or from data buffer 808 when data is available in the buffer. Thereafter, CQE 800 monitors the completion of an operation for each DTD 600 and fetches the next linked DTD 600 to continue operations. If no more linked DTD 600s are available for execution, CQE 800 is programmed to wait for subsequent DTD 600s or to interrupt processor 84.

Similarly, when activated by a GO command on line 802A, status transfer engine 860 monitors DTD buffer 850 by fetching DTD 600s over connection 855. When data transfer engine 840 posts completion of an operation in a DTD 600, status transfer engine 860 is enabled to provide status to the initiator via SCSI core 876. In one embodiment, status transfer engine 860 only transmits status for write operations. CQE 800 maintains separate pointers to DTD buffer 850 for data transfer engine 840 and status transfer engine 860.

For read operations, status transfer engine provides status at the end of the data transfer to initiator phase of command execution. For write operations, status transfer engine 860 performs a status transfer when the data is written on the media. In the manner described above, data transfer engine 840 and status transfer engine 860 operate to automatically process queued sequential commands separately from microprocessor 84 by using a DTD 600 to define each operation.

Figure 7:
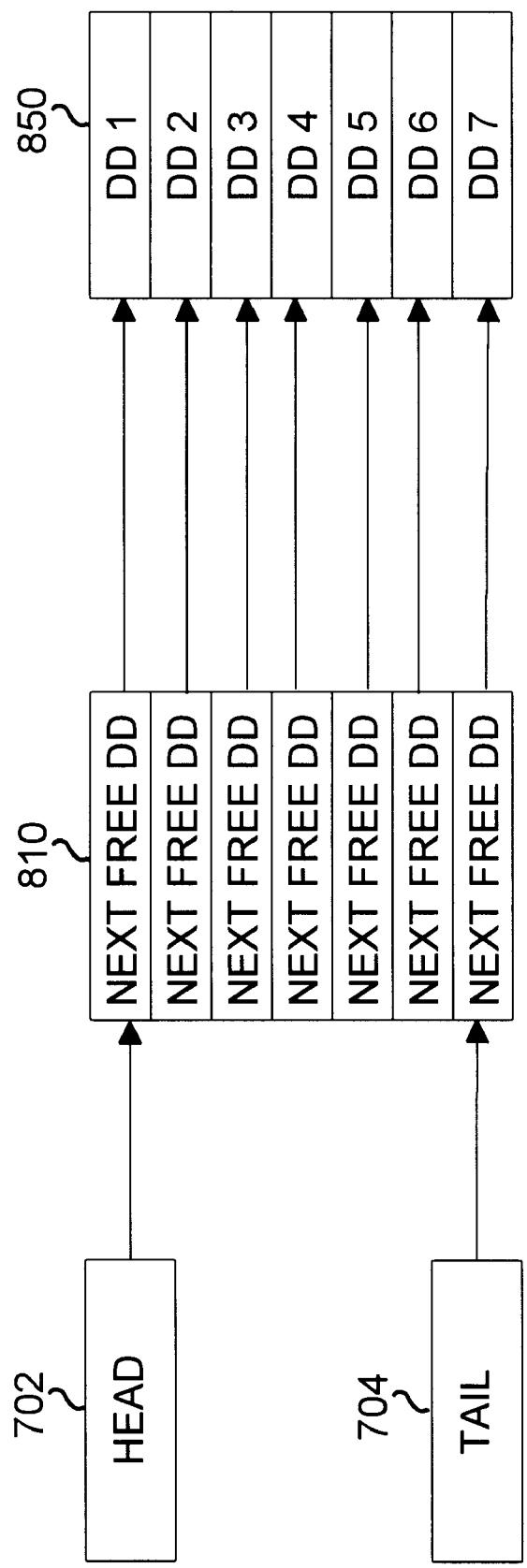
FIG. 7 is an illustration of a free pointer list for managing available buffer space for the storage of data transfer descriptors.

FIG. 7 shows the a conceptual view of free pointer list 810, DTD buffer 850, and an exemplary head pointer 702 and tail pointer 704. Head pointer 702 is initialized to point to the first free pointer in free pointer list 810. As indicated by the arrowed lines, each pointer in free pointer list 810 references a block or slot of memory locations in DTD buffer 850. Tail pointer 704 is initialized to point to the last free pointer in free pointer list 810. As each DTD block in DTD buffer is used, head pointer 702 is updated to point to the next free pointer. When head pointer 702 overlaps tail pointer 704, there are no more free pointers and automatic processing may be disabled until free blocks become available. The head and tail pointers 702,704 may be manipulated to wrap around the pointer list 810 so that a ring type buffer may be implemented. Suitably, separate head and tail pointers may be provided for data transfer engine 840, and status transfer engine 860.

Placing the elements of FIG. 8 in the context of disk drive 30 as shown in FIG. 9, disk controller 880 can suitably be implemented as disk controller 80, while DMA engine 870 can be included within buffer controller 78. Data buffer 882 may be implemented as buffer memory 82 of FIG. 9. Host interface 76 may comprise SCSI core 876, DTDG 820 and command registers 830. Data buffer 882, free pointer list 810, and DTD buffer 850 may suitably be mapped into buffer memory 82.

Figure 5:
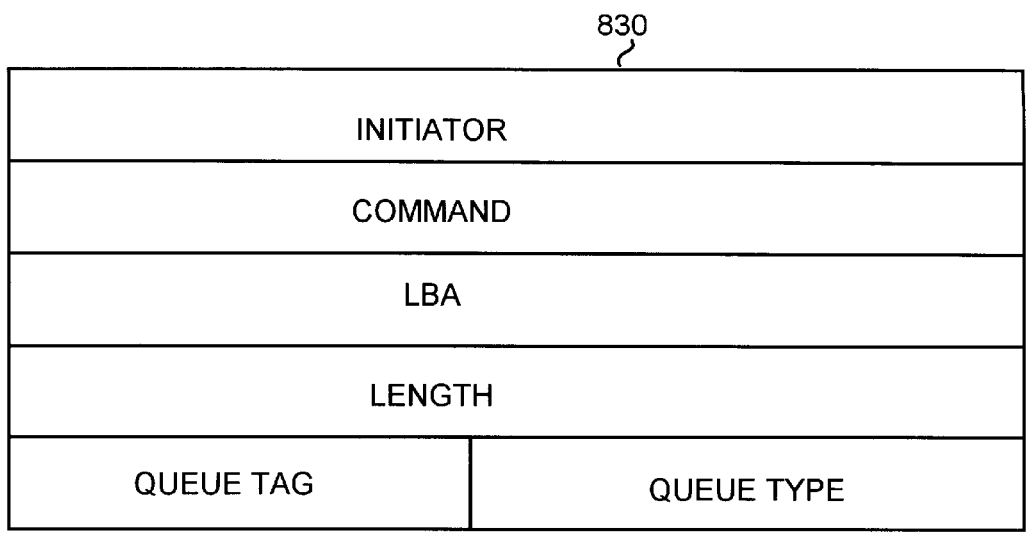
FIG. 5 is an illustration showing the CDB information of a previously received command stored by the ASIC hardware in command registers for comparison with a newly received command.
Figure 6:
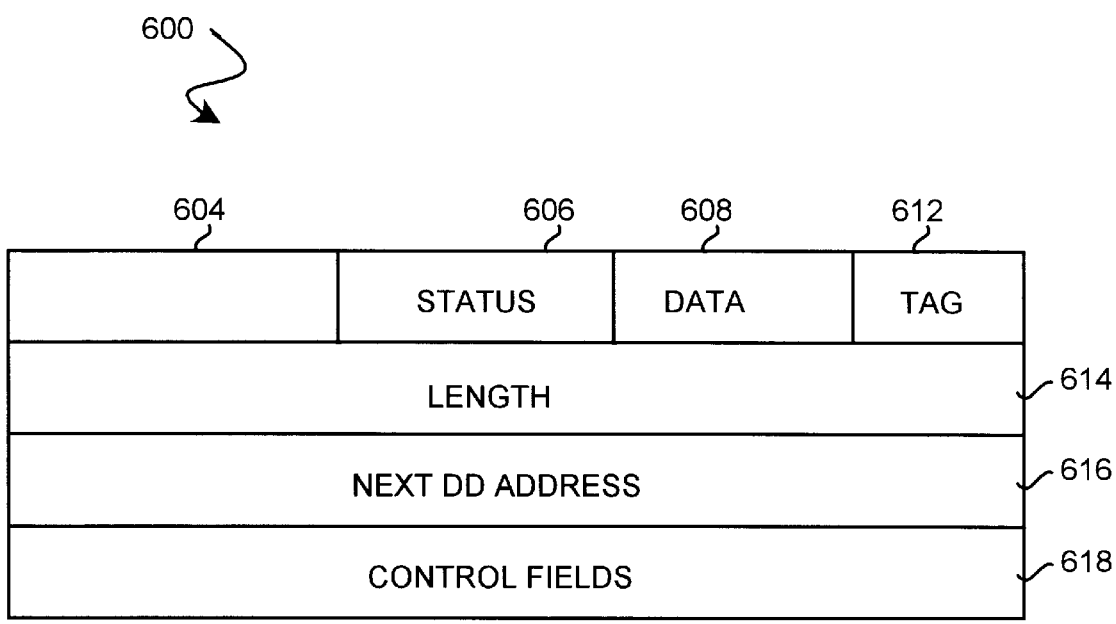
FIG. 6 is an illustration of an exemplary 4-word data transfer descriptor used by the ASIC hardware to process sequential commands without requiring interrupts for microprocessor intervention.

Referring to FIG. 6, in one embodiment DTDG 820 creates 8-byte (4-word) data transfer descriptors for each CDB received by host interface 76. Word 0 includes a queue tag 612 in addition to control bits—STATUS bit 606, and DATA bit 608. STATUS bit 606 when set directs the CQE to activate the status transfer engine 860 for write operations. Setting DATA bit 608 indicates a read/write data transfer. An expansion field 604 provides for additional control bits in another embodiment. Word 1 contains length field 614, which defines the number of data blocks to be transferred. Word 2 contains next DTD address 616, a pointer linking the next entry in DTD buffer 850. Word 3 includes expansion field 618 which provides for additional controls for coordinating the operation of CQE 800 with firmware executed by processor 84 in another embodiment. When the DTD 600 information is combined with the command and initiator information from command registers 830 as shown in FIG. 5, the information necessary for executing the command automatically is available to CQE 800, thereby eliminating command overhead from interrupt processing by interface processor 84.

I Claim:

1. A target interface controller for connecting a target to an initiator over a communication bus, the target interface controller comprising:

a) a host interface means, connected to the communication bus for communicating between the target and the initiator;

b) an interface microprocessor;

c) a bus interface means connected to the interface microprocessor;

d) a command queuing means, connected to the bus interface means and separated from the interface microprocessor, to automatically execute a plurality of initiator commands, the command queuing means comprising:

I. a means for detecting that one of the plurality of initiator commands specifies a first string of data blocks and is a thread_start_command comprising a start of a thread;

II. a means for generating a data transfer descriptor for each of the plurality of initiator commands;

III. a means for detecting that an initiator command subsequent to the thread_start_command references a second string of contiguous data blocks that sequentially follows the first string of data blocks;

IV. a means for storing the data transfer descriptors generated for each initiator command;

V. a means for linking the data transfer descriptors to form a thread of sequential data transfers; and e) a command execution means for retrieving the data transfer descriptors to cause the thread of sequential data transfers to be executed.

2. The target interface controller of claim 1 wherein each data transfer descriptor comprises a length field.

3. The target interface controller of claim 1 wherein each data transfer descriptor comprises a link field to specify an address of a linked data transfer descriptor.

4. The target interface controller of claim 1 wherein each data transfer descriptor comprises a queue tag field to identify a queue tag number.

5. The target interface controller of claim 1 wherein the command queuing means requests an interrupt of the interface processor when execution of the thread is suspended.

6. The target interface means of claim 1 wherein the means for storing a plurality of data transfer descriptors comprises a memory buffer.

7. The target interface controller of claim 6 wherein the means for storing a plurality of data transfer descriptors further comprises a pool of pointers to free locations in the memory buffer.

8. A disk drive having a target interface controller for connecting a target to an initiator, the target interface controller comprising:
   a) a host interface means connected to the communication bus for communicating between the target and the initiator;
   b) an interface microprocessor;
   c) a bus interface means connected to the interface microprocessor;
   d) a command queuing means, connected to the bus interface means and separated from the interface microprocessor, to automatically execute a plurality of initiator commands, the command queuing means comprising:
      I. a means for detecting that one of the plurality of initiator commands specifies a first string of data blocks and is a thread_start_command comprising a start of a thread;
      II. a means for generating a data transfer descriptor for each of the plurality of initiator commands;
      III. a means for detecting that an initiator command subsequent to the thread_start_command references a second string of contiguous data blocks that sequentially follows the first string of data blocks;
      IV. a means for storing the data transfer descriptors generated for each initiator command;
      V. a means for linking the data transfer descriptors to form a thread of sequential data transfers; and
   e) a command execution means for retrieving the data transfer descriptors to cause the thread of sequential data transfers to be executed.

9. The disk drive of claim 8 wherein each data transfer descriptor comprises a length field.

10. The disk drive of claim 8 wherein each data transfer descriptor comprises a link field to specify an address of a linked data transfer descriptor.

11. The disk drive of claim 8 wherein the data transfer descriptor comprises a queue tag field to identify a queue tag number.

12. The disk drive of claim 8 wherein the command queuing means requests an interrupt of the interface processor when execution of the thread is suspended.

13. The command queuing means of claim 8 wherein the means for storing a plurality of data transfer descriptors comprises a memory buffer.

14. The command queuing means of claim 13 wherein the means for storing a plurality of data transfer descriptors further comprises a pool of pointers to free locations in the memory buffer.

15. A target interface controller integrated circuit for use in a disk drive target connectable to an initiator and having an interface microprocessor, the integrated circuit comprising:
   a) a host interface means, connected to the communication bus for communicating between the target and the initiator;
   b) a bus interface means connected to the interface microprocessor;
   c) a command queuing means, connected to the bus interface means and separated from the interface microprocessor, to automatically execute a plurality of initiator commands, the command queuing means comprising:
      I. a means for detecting that one of the plurality of initiator commands specifies a first string of data blocks and is a thread_start_command comprising a start of a thread;
      II. a means for generating a data transfer descriptor for each of the plurality of initiator commands;
      III. a means for detecting that an initiator command subsequent to the thread_start_command references a second string of contiguous data blocks that sequentially follows the first string of data blocks;
      IV. a means for storing the data transfer descriptors generated for each initiator command;
      V. a means for linking the data transfer descriptors to form a thread of sequential data transfers; and
   d) a command execution means for retrieving the data transfer descriptors to cause the thread of sequential data transfers to be executed.

* * * * *